(12) United States Patent
Shi

(10) Patent No.: US 12,397,835 B1
(45) Date of Patent: Aug. 26, 2025

(54) FOLDABLE BOX BODY AND SHOPPING CART USING SAME

(71) Applicant: Zhonglei Shi, Zhejiang (CN)

(72) Inventor: Zhonglei Shi, Zhejiang (CN)

( * ) Notice: Subject to any disclaimer, the term of this patent is extended or adjusted under 35 U.S.C. 154(b) by 0 days.

(21) Appl. No.: 19/023,382

(22) Filed: Jan. 16, 2025

(30) Foreign Application Priority Data

Jan. 4, 2025 (CN) .......................... 202520019344.0

(51) Int. Cl.
  *B62B 3/02*  (2006.01)
  *B62B 3/00*  (2006.01)
  *B62B 5/02*  (2006.01)
  *B62B 5/06*  (2006.01)
  *B65D 21/08* (2006.01)

(52) U.S. Cl.
  CPC .............. *B62B 3/027* (2013.01); *B62B 3/002* (2013.01); *B62B 5/026* (2013.01); *B62B 5/067* (2013.01); *B65D 21/086* (2013.01); *B62B 2301/044* (2013.01); *B62B 2301/254* (2013.01)

(58) Field of Classification Search
  CPC ......... B62B 3/027; B62B 3/002; B62B 5/026; B62B 5/067; B62B 2301/044; B62B 2301/254; B65D 21/086
  See application file for complete search history.

(56) References Cited

U.S. PATENT DOCUMENTS

| | | | |
|---|---|---|---|
| 6,073,943 A * | 6/2000 | Serrault ................. | B65F 1/122 280/30 |
| 6,431,580 B1 * | 8/2002 | Kady ..................... | B62B 1/125 280/655 |
| 7,147,243 B2 * | 12/2006 | Kady ..................... | A45C 7/0045 280/655 |
| D545,025 S * | 6/2007 | Elden .................... | D34/25 |
| 7,669,862 B2 | 3/2010 | Kamara et al. | |
| 8,579,305 B2 * | 11/2013 | Hou ...................... | A01K 1/0245 280/655 |
| 8,641,059 B2 * | 2/2014 | Khodor ................. | B62B 1/12 280/47.28 |
| 9,382,035 B2 * | 7/2016 | Fritz .................... | B65D 21/0213 |
| 10,676,235 B1 * | 6/2020 | Song ..................... | B65D 11/1873 |
| 11,110,948 B2 * | 9/2021 | Song ..................... | B62B 5/067 |
| 11,338,835 B2 * | 5/2022 | Elden ................... | B62B 5/0013 |
| D985,225 S * | 5/2023 | Elden ................... | D34/25 |
| 12,103,576 B2 * | 10/2024 | Elden ................... | B62B 3/025 |
| 2003/0011173 A1 * | 1/2003 | Shall ..................... | A01K 97/22 280/639 |
| 2003/0034636 A1 * | 2/2003 | Ng ........................ | A45C 7/0077 280/47.24 |
| 2006/0244242 A1 | 11/2006 | Woo | |
| 2009/0145913 A1 * | 6/2009 | Panosian ............... | B62B 1/12 220/666 |

(Continued)

*Primary Examiner* — Valentin Neacsu
*Assistant Examiner* — Michael R Stabley
(74) *Attorney, Agent, or Firm* — S.J. Intellectual Property LTD.

(57) ABSTRACT

A foldable box body and a shopping cart using same are provided. The foldable box body includes a box plate, which forms an accommodating space. The box plate includes a front box plate and a rear box plate. A flexible folding portion is provided between the front box plate and the rear box plate. The front box plate and the rear box plate are foldable by means of the flexible folding portion. The foldable box body is provided on the shopping cart.

13 Claims, 11 Drawing Sheets

(56) References Cited

U.S. PATENT DOCUMENTS

| | | | |
|---|---|---|---|
| 2010/0026080 A1* | 2/2010 | Colchiesqui | B62B 5/026 |
| | | | 301/5.23 |
| 2014/0117072 A1* | 5/2014 | Cullen | B65D 25/2873 |
| | | | 229/117.05 |
| 2014/0151172 A1 | 6/2014 | Diaz | |
| 2019/0322302 A1* | 10/2019 | Greenup | B62B 1/002 |
| 2023/0322285 A1* | 10/2023 | Maenhout | B62B 5/0036 |
| | | | 180/65.1 |

* cited by examiner

FOLDABLE BOX BODY AND SHOPPING CART USING SAME

CROSS REFERENCE TO RELATED APPLICATIONS

This application claims priority benefits to Chinese Patent Application No. 2025200193440, filed on Jan. 4, 2025; the contents of which are incorporated herein by reference.

TECHNICAL FIELD

Embodiments of the present application relate to a box body and a shopping cart, and in particular relates to a foldable box body and a shopping cart using the foldable box body.

BACKGROUND

In the related art, a box body or a shopping cart is generally a rigid structure, and it is difficult to achieve complete sealing at the connection or folding points, or expensive improvement measures is required to achieve complete sealing. It can only accommodate or load solids and cannot transport liquids. Meanwhile, the box body or shopping cart having a rigid structure has a complicated folding manner, cannot be folded and unfolded in one step, and needs various additional structures to fix the shape of the box body after being unfolded, thereby increasing the inconvenience in use and manufacturing costs. There is an urgent need to improve the above-mentioned problems.

SUMMARY

An object of embodiments of the present application is to provide a foldable box body and a shopping cart using same. The technical problem to be solved firstly is to overcome the defect in the related art that a box body or a shopping cart cannot be completely sealed, and a second technical problem to be solved secondly is to fix the shape of the box body or the shopping cart after being unfolded without an additional structure.

According to one aspect of the embodiments of the present application, a foldable box body is provided. The foldable box body forms an accommodating space by means of a box plate. The box plate comprises a front box plate and a rear box plate. A flexible folding portion is provided between the front box plate and the rear box plate. A foldable structure is formed between the front box plate and the rear box plate by means of the flexible folding portion.

According to at least one specific embodiment of the present application, the flexible folding portion is integrally formed or movably connected between the front box plate and the rear box plate.

According to at least one specific embodiment of the present application, the flexible folding portion is U-shaped, one side of the flexible folding portion is fixedly connected to the front box plate, and the other side of the flexible folding portion is fixedly connected to the rear box plate.

According to at least one specific embodiment of the present application, fixing fasteners are provided between the front box plate and the rear box plate, one end of each of the fixing fasteners is movably connected to the front box plate, and the other end of each of the fixing fasteners is movably connected to the rear box plate.

According to at least one specific embodiment of the present application, the fixing fasteners are bar-shaped, fixing columns are provided at two ends of each of the fixing fasteners, and fixing pores corresponding to the fixing columns are provided at corresponding positions of the front box plate and the rear box plate.

According to at least one specific embodiment of the present application, the foldable box body further comprises an upper box plate rotatably connected to the rear box plate, and/or the foldable box body further comprises a lower box plate rotatably connected to the front box plate.

According to at least one specific embodiment of the present application, a fixing clamping notch is provided at an edge of the upper box plate, and clamping grooves corresponding to the fixing clamping notch are provided at corresponding edge positions of the front box plate and the rear box plate.

According to at least one specific embodiment of the present application, an upper box plate rotating shaft is provided on the front box plate, an upper box plate rotating clamping groove corresponding to the upper box plate rotating shaft is provided on the upper box plate, a lower box plate rotating pore is provided on the rear box plate, and a lower box plate rotating shaft corresponding to the lower box plate rotating pore is provided on the lower box plate.

According to at least one specific embodiment of the present application, an overturning pull ring or an overturning pull belt is provided on the upper box plate.

According to at least one specific embodiment of the present application, a storage groove is provided on an inner side of the front box plate, and a knob switch is mounted on the storage groove.

According to at least one specific embodiment of the present application, provided is a shopping cart. The shopping cart is provided with a foldable box body.

According to at least one specific embodiment of the present application, a telescopic handle is mounted at an upper end of the front box plate.

According to at least one specific embodiment of the present application, the telescopic handle is rotatably connected to the front box plate.

According to at least one specific embodiment of the present application, universal wheels are provided at a bottom of the shopping cart.

According to at least one specific embodiment of the present application, climbing wheel sets are detachably provided at lower portions on two sides of the shopping cart.

Compared with the related art, the embodiments of the present application have the following advantages:

The foldable box body provided in the embodiments of the present application at least comprises a flexible folding portion. The flexible folding portion is fitted with components such as a front box plate and a rear box plate to form a foldable structure, so that an accommodating space of the box body can be changed along with the deformation of the flexible folding portion, thereby facilitating accommodation and placement in different usage scenarios.

Since the folding and unfolding of the foldable box body are both achieved by means of components and structures thereof, the foldable box body and the shopping cart using same do not need an additional structure to fix the shape of the box body or the shopping cart after being unfolding, thereby reducing the structural complexity of the box body and the shopping cart, reducing production and manufacturing costs, and improving the user's experience.

In addition to having functions of conventional box bodies and shopping carts, a shopping cart using same also achieves a function of storing liquid by using a flexible folding portion. Because the flexible folding portion has stronger sealing properties than that of the rigid structure, the foldable box body and the shopping cart provided in the embodiments of the present application can hold or contain liquid, ensures no leakage, and has more use than conventional box bodies and shopping carts.

BRIEF DESCRIPTION OF THE DRAWINGS

The accompanying drawings, which form a part of the present application, are used for providing a further understanding of the present application. The schematic embodiments and illustrations of the present application are used for explaining the present application, and do not form improper limits to the present application.

DESCRIPTION OF REFERENCE NUMERALS

Figure 1:
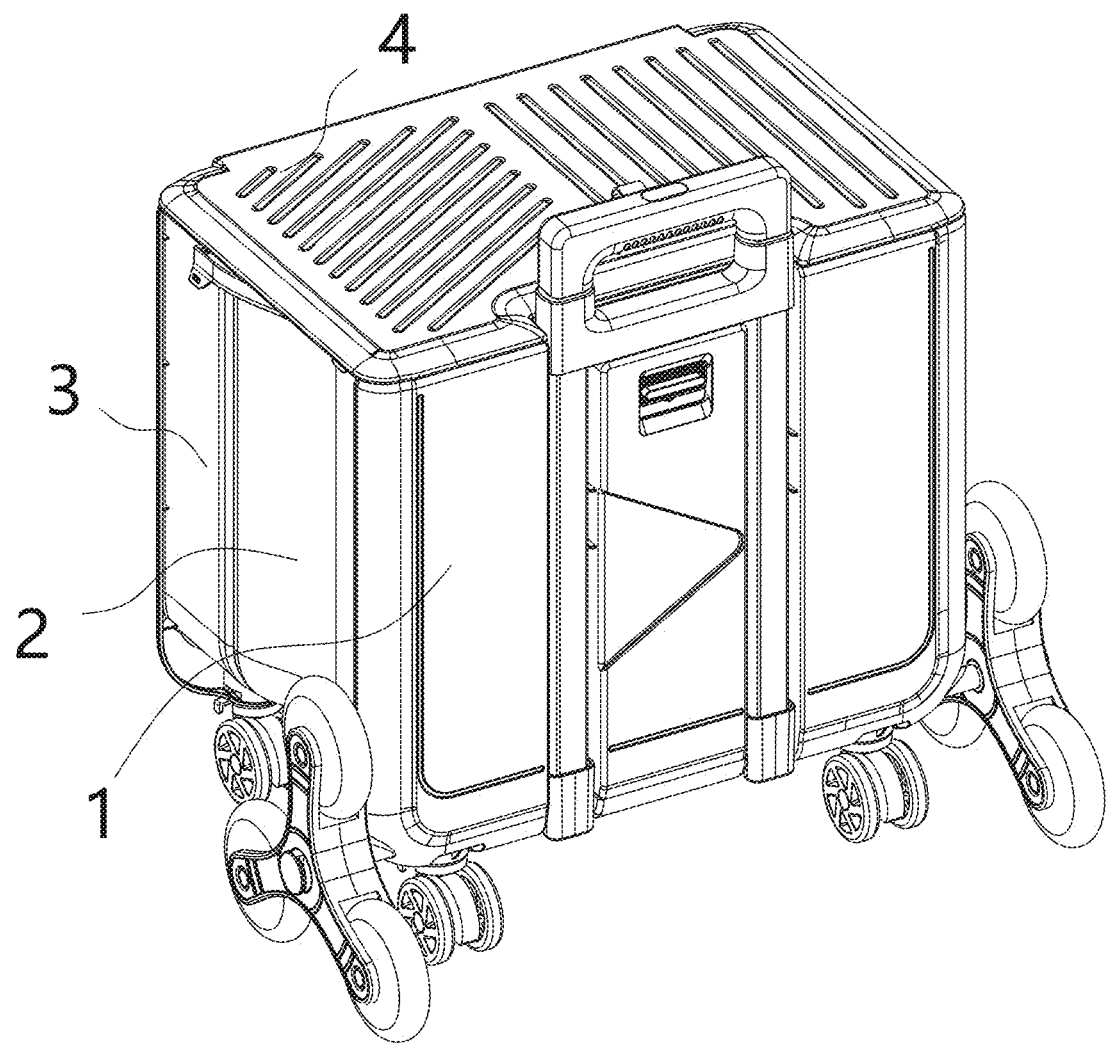
FIG. 1 is a three-dimensional structural diagram of a foldable box body and a shopping cart according to an embodiment of the present application.
Figure 2:
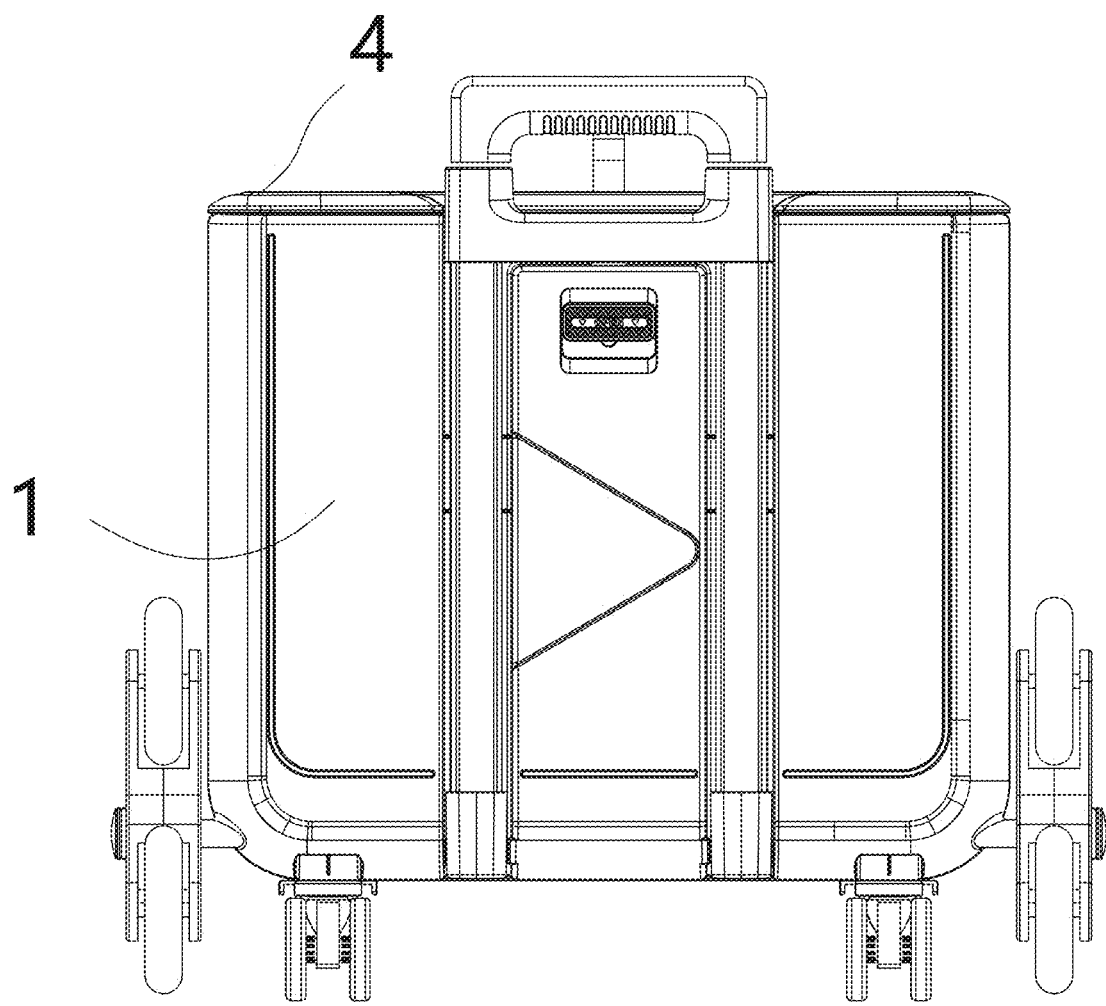
FIG. 2 is a front structural diagram of a foldable box body and a shopping cart according to an embodiment of the present application.
Figure 3:
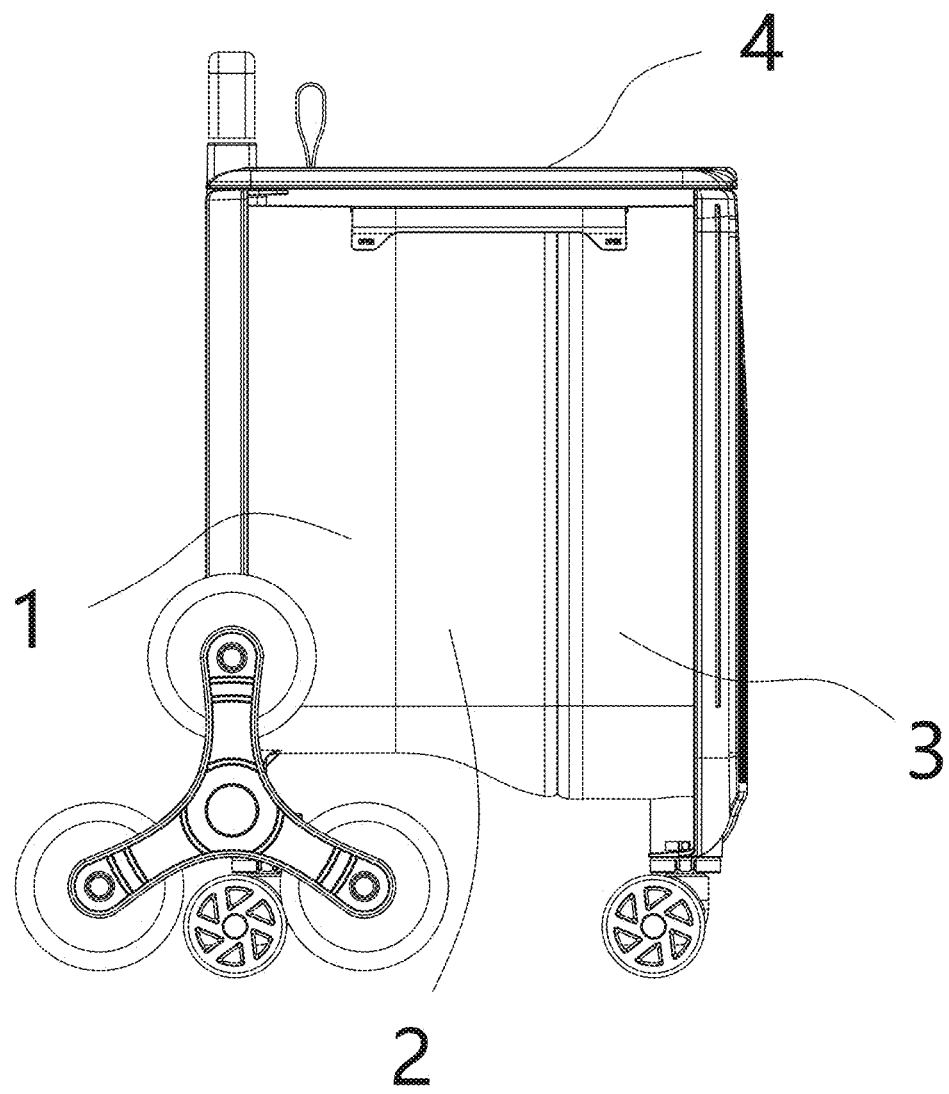
FIG. 3 is a side structural diagram of a foldable box body and a shopping cart according to an embodiment of the present application.
Figure 4:
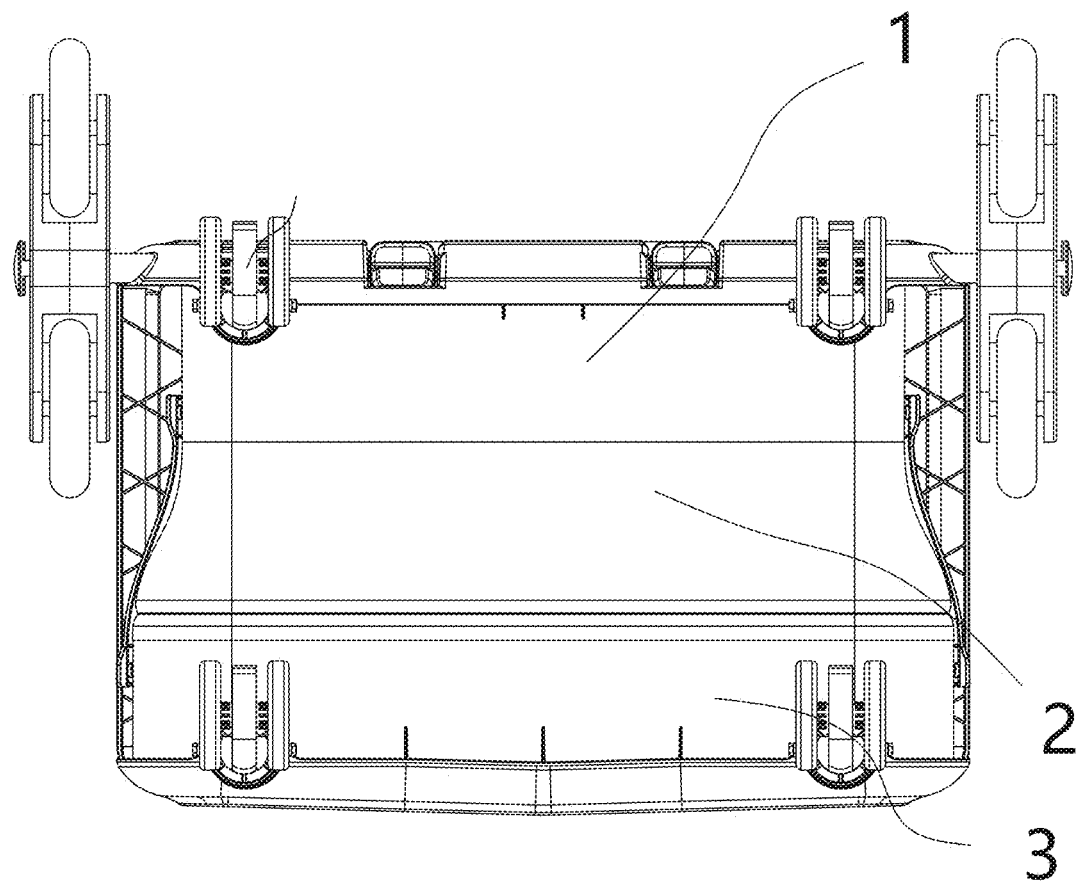
FIG. 4 is a bottom structural diagram of a foldable box body and a shopping cart according to an embodiment of the present application.
Figure 5:
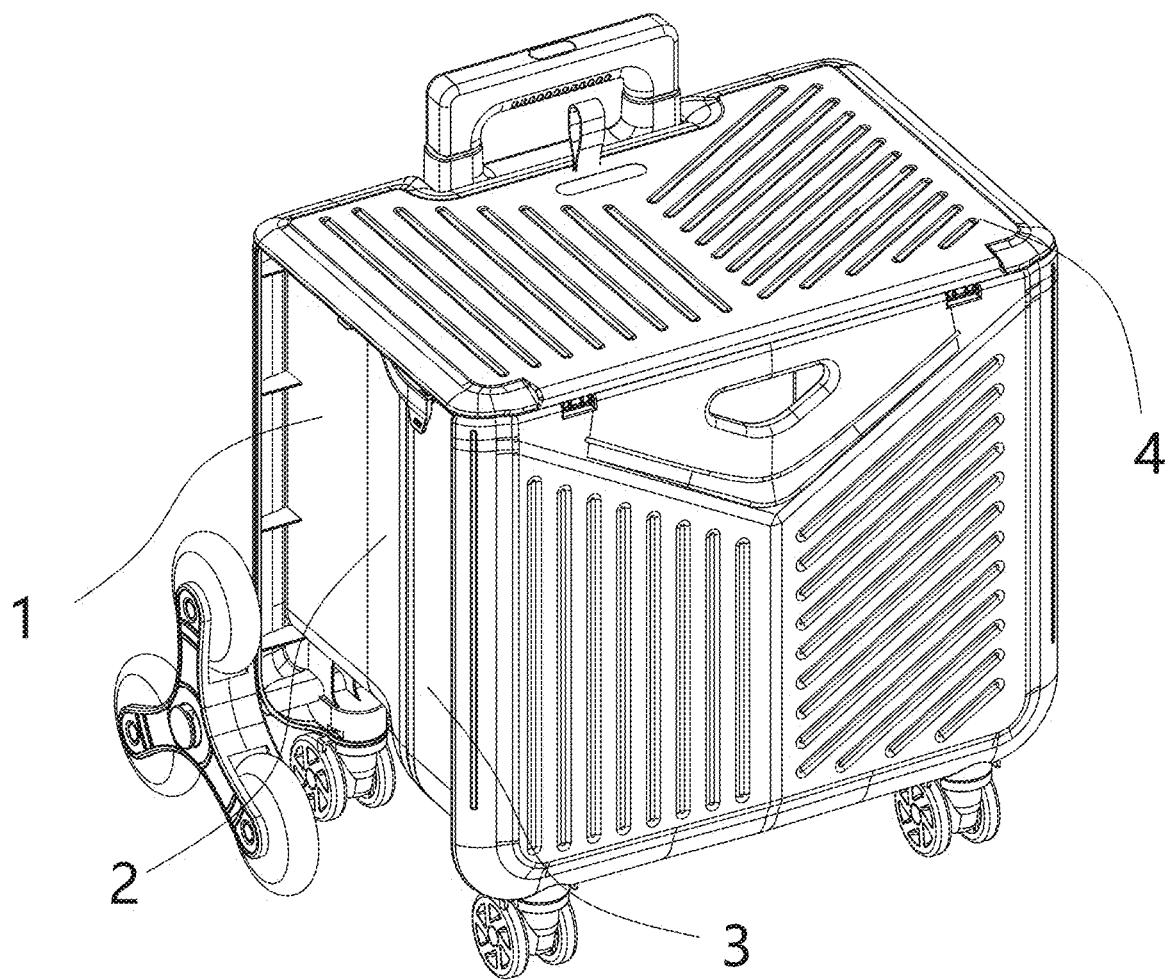
FIG. 5 is a perspective structural diagram of a foldable box body and a shopping cart in another view angle.
Figure 6:
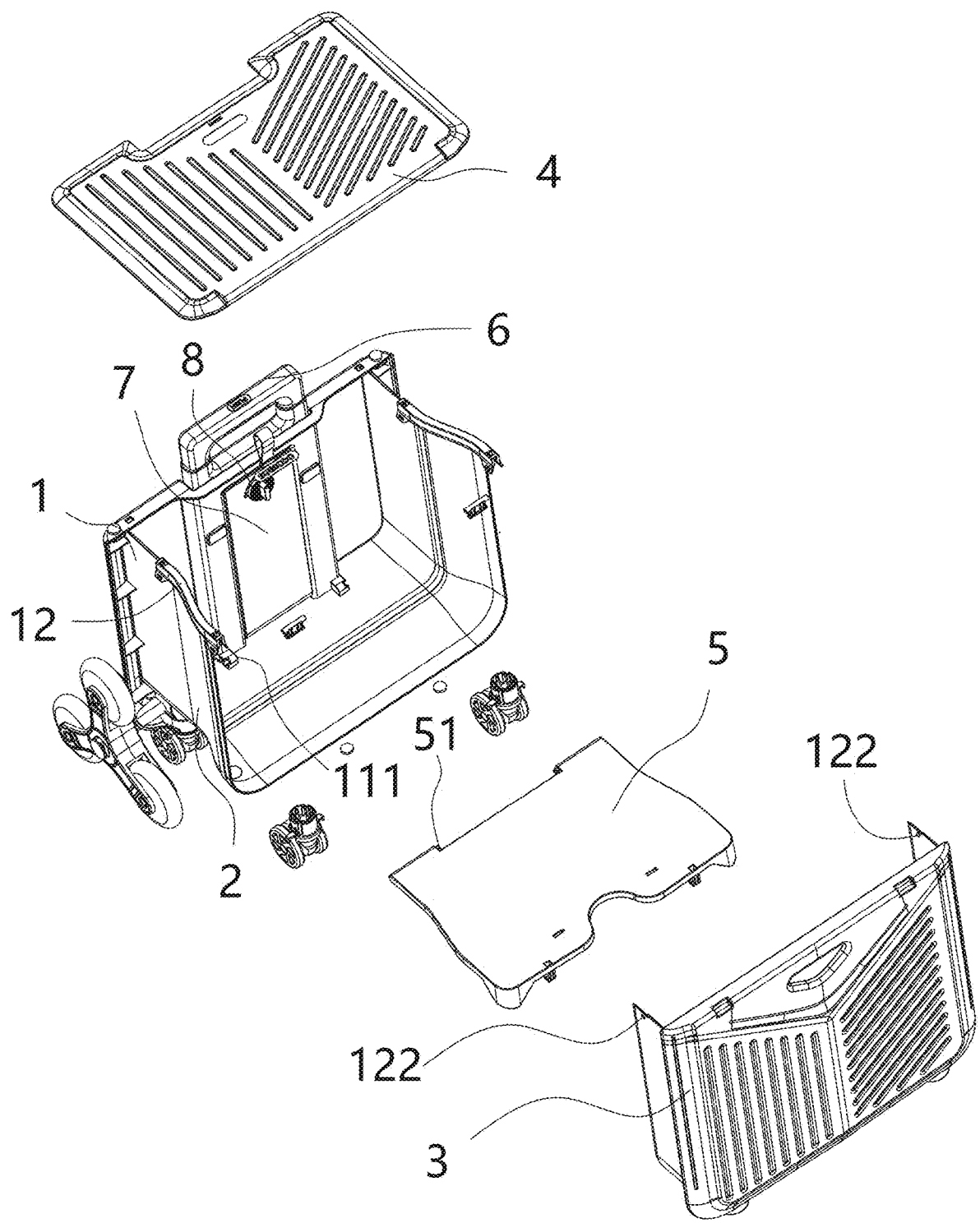
FIG. 6 is an exploded structural diagram of a foldable box body and a shopping cart according to an embodiment of the present application.
Figure 6A:
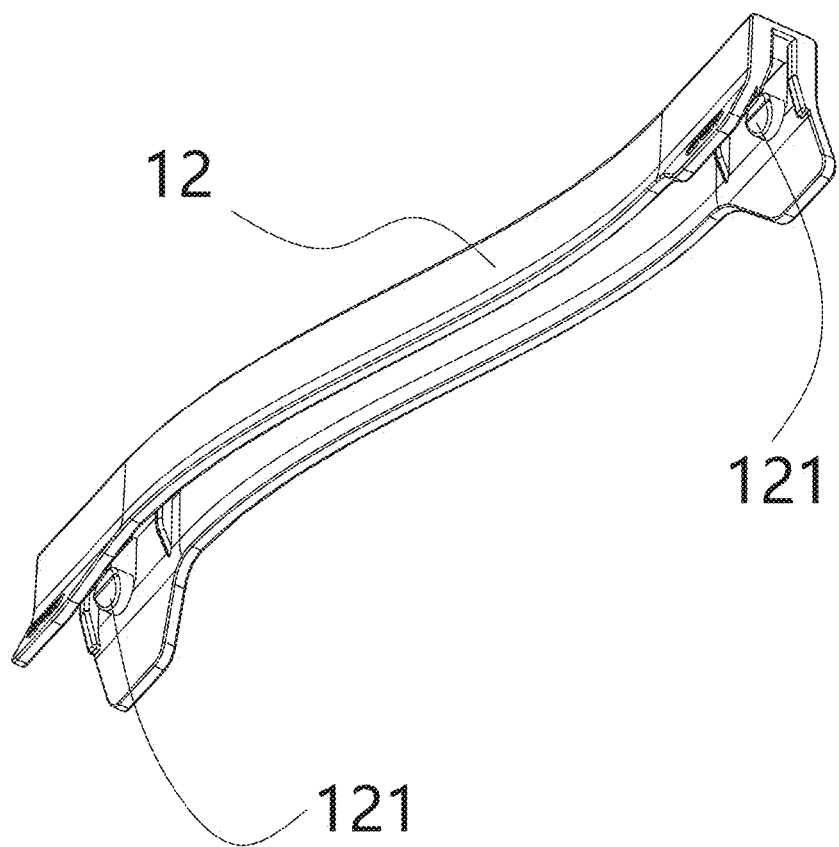
FIG. 6A shows a structural diagram of a fixing fastener.

1—front box plate
2—flexible folding portion
20—flexible folding portion accommodating space
3—rear box plate
4—upper box plate
5—lower box plate
6—telescopic handle
7—storage groove
8—knob switch
9—overturning pull belt
10—universal wheel
11—climbing wheel set
12—fixing fastener
13—connection between lower box plate and front box plate
14—connection between upper box plate and rear box plate

DETAILED DESCRIPTION

The following clearly and completely describes the technical solutions of the embodiments of the present application with reference to the accompanying drawings. Apparently, the described embodiments are a part rather than all of the embodiments of the present application. All other embodiments obtained by a person of ordinary skill in the art based on the embodiments of the present application without creative efforts shall belong to the scope of protection of the embodiments of the present application.

As shown in FIGS. 1-8, the embodiments of the present application provide a foldable box body. The foldable box body forms an accommodating space by means of a box plate. The box plate comprises a front box plate 1 and a rear box plate 3. A flexible folding portion 2 is provided between the front box plate 1 and the rear box plate 3. A foldable structure is formed between the front box plate 1 and the rear box plate 3 by means of the flexible folding portion 2. In the main implementations of the embodiments of the present application, a foldable box body can be achieved by providing at least one flexible folding portion 2 between the front box plate 1 and the rear box plate 3. Generally, in addition to the flexible folding portion 2, other components such as the front box plate 1 and the rear box plate 3 of the box body are made of inflexible and rigid materials, for example, hard plastics, metal alloys, etc., but the possibility that the components such as the front box plate 1 and the rear box plate 3 are made of other flexible foldable materials is not excluded. The foldable box body provided in the embodiments of the present application may be a box body with an opening at one end, and may also be a box body with openings at two ends, for example, a box body with a top and a bottom movably connected to the front box plate 1 and the rear box plate 3. The main feature of the foldable box body is achieved by the flexible folding portion 2, the front box plate 1 and the rear box plate 3. The specific shape of the box body is not particularly limited. Alternative types of flexible foldable materials may include polymeric films, fibrous fabrics, rubbers, etc., as long as flexibility and foldability are both satisfied. When the foldable box body and the shopping cart using same are in an unfolded state, the front box plate 1 and the rear box plate 3 are at the farthest distance, and the flexible folding portion 2 is also in the maximum range in which the flexible folding portion can be folded. In this case, the box body has the largest accommodating space, and thus is suitable for transporting articles or liquids, and has a shape similar to that of a normal luggage box, luggage cart or shopping cart. When the foldable box body and the shopping cart using same are in a folded state, the front box plate 1 and the rear box plate 3 are at a minimum distance, and the flexible folding portion 2 is also in the smallest range in which the flexible folding portion can be unfolded. In this case, the box body has the smallest accommodating space, and the whole space of the box body is relatively flat, and the foldable box body is suitable for placing and not using, thereby reducing the space occupied by the box body and the shopping cart.

Optionally, the flexible folding portion 2 is integrally formed or movably connected between the front box plate 1 and the rear box plate 3. Integral molding refers to processing the flexible folding portion 2 into an integral structure with the front box plate 1 and the rear box plate 3 through a one-time process in the manufacturing process. The features of integrally molding includes a more compact structure and a more concise and smooth appearance for a product, because splicing gaps between different components are reduced, the advantage lies in that the strength and stability of the product are improved; and as there is no additional connection point, the vulnerability or failure risk caused by the connection position is reduced, assembly procedures are reduced, production efficiency is improved, costs are reduced, and more complex design concepts are facilitated.

The movable connection refers to the flexible folding portion 2, the front box plate 1 and the rear box plate 3 being movably connected. The features of the movable connection include the components can move relative to each other, and the advantages of using the movable connection between the front box plate 1, the flexible folding portion 2 and the rear box plate 3 lie in being able to adapt to usage requirements under different scenarios. When the angle or position needs to be adjusted, the movable connection can provide flexibility so as to facilitate disassembly and maintenance. If a certain component is damaged, the component can be replaced directly without replacing the whole structure, and the movable connection can absorb vibration and impact from the outside to some extent, to protect the whole structure of the box body and the shopping cart.

As a further improvement of the embodiments of the present application, in some embodiments, the flexible folding portion 2 is U-shaped, one side of the flexible folding portion 2 is fixedly connected to the front box plate 1, and the other side of the flexible folding portion 2 is fixedly connected to the rear box plate 3. In these embodiments, the shape of the flexible folding portion 2 generally conforms to the shape of the front box plate 1 and the rear box plate 3, i.e., the shape of the front box plate 1 and the rear box plate 3 are also approximately U-shaped, and the bottom of the U shape is the bottom of the box body, two sides of the U shape are connected to two side surfaces of the box body, i.e., connected to the front box plate 1 and the rear box plate 3, and the front box plate 1 and the rear box plate 3 can be provided to have a flanged structure, the flanges are arranged opposite to each other in a spatial position, and the function of the flanges is to serve as a connection portion for fixed or movable connection with the flexible folding portion 2. When the box body changes from an unfolded state to a folded state, the front box plate 1 and the rear box plate 3 move towards each other, the accommodating space of the box body is reduced, a flexible folding portion accommodating space 20 for accommodating the flexible folding portion 2 is formed between the front box plate 1 and the rear box plate 3, and a three-fold structure of the front box plate 1, the flexible folding portion accommodating space 20 (for accommodating the flexible folding portion 2) and the rear box plate 3 is formed on two sides of the folded box body. After the box body is folded, the flexible folding portion accommodating space 20 formed between the flanges of the front box plate 1 and the rear box plate 3 provides an accommodating condition for accommodating the flexible folding portion 2, and only the flexible material structure can be accommodated into the flexible folding portion accommodating space 20. The flexible folding portion 2 using the flexible material is a substantive feature and key technology of the embodiments of the present application, and has significant improvements compared with the related art.

In some embodiments, fixing fasteners 12 are provided between the front box plate 1 and the rear box plate 3, one end of each of the fixing fasteners 12 is movably connected to the front box plate 1, and the other end of each of the fixing fasteners 12 is movably connected to the rear box plate 3; the fixing fasteners 12 are bar-shaped, fixing columns 121 are provided at two ends of each of the fixing fasteners 12, and fixing pores 122 corresponding to the fixing columns 121 are provided at corresponding positions of the front box plate 1 and the rear box plate 3. The fixing columns 121 on the fixing fastener 12 are used in cooperation with the fixing pores 122 on the front box plate 1 and the rear box plate 3, so that the flexible folding portion 2 can be fixedly connected to the front box plate 1 and the rear box plate 3 to prevent looseness. The fixing columns 121 are provided on an inner side of the strip-shaped fixing fastener 12, are two oppositely arranged columns, and there is a certain gap between the two columns. Furthermore, the fixing fastener 12 has a certain elasticity, and can slightly adjust the distance between the gaps of the two columns, and only a slight force needs to be applied when fixing, so that the fixing fastener 12 is slightly deformed, the gap between the fixing columns 121 is enlarged, and then the two columns are aligned with the fixing pores 122 between the front box plate 1 and the rear box plate 3, and thus, the fixed connection between the flexible folding portion 2 and the front box plate 1 and the rear box plate 3 can be achieved.

In some embodiments, the foldable box body further comprises an upper box plate 4 and a lower box plate 5 in addition to the front box plate 1 and the rear box plate 3, in which the upper box plate 4 is rotatably connected to the rear box plate 3, and the lower box plate 5 is rotatably connected to the front box plate 1, the upper box plate 4 and the lower box plate 5 do not necessarily exist at the same time, and the foldable box body may have only one upper box plate 4, or only one lower box plate 5, or both the upper box plate 4 and the lower box plate 5, that is to say, only one or both of the upper box plate and the lower box plate of the foldable box may be present. The upper box plate 4 and the lower box plate 5 are both provided to be rotatably connected for fitting with the deformation of the flexible folding portion 2. After the flexible folding portion 2 is deformed, the position between the front box plate 1 and the rear box plate 3 will change. The upper box plate 4 and the lower box plate 5 can be accommodated in the box body by means of rotating connection, so that the structure of the box body is more compact. The upper box plate and the lower box plate achieve accommodating by means of the rotating connection structure thereof when the box body is deformed, without requiring an additional structure and without occupying the outer space of the box body.

Figure 7:
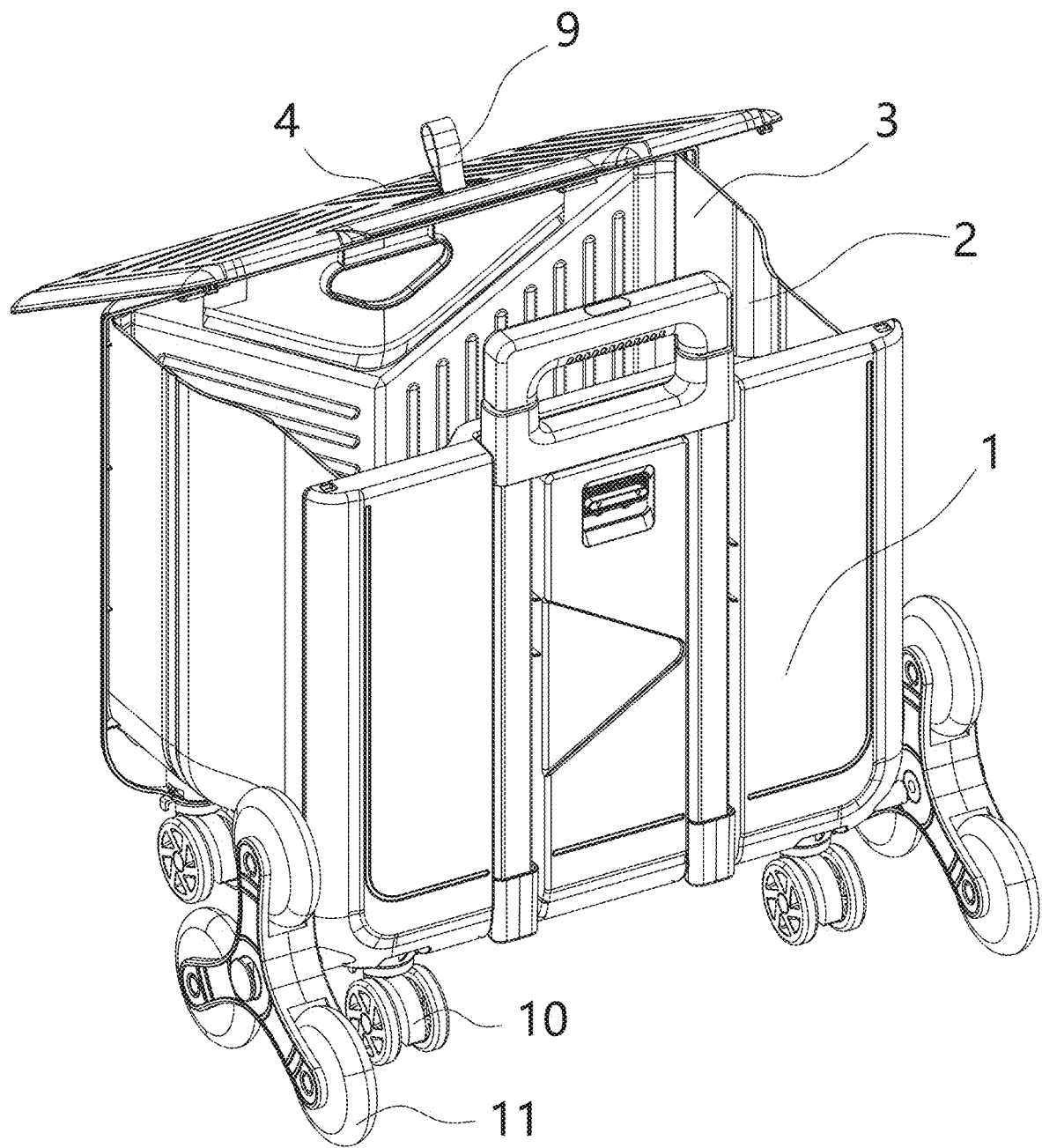
FIG. 7 is a structural diagram of a foldable box body and a shopping cart with an upper box plate opened according to an embodiment of the present application.
Figure 7A:
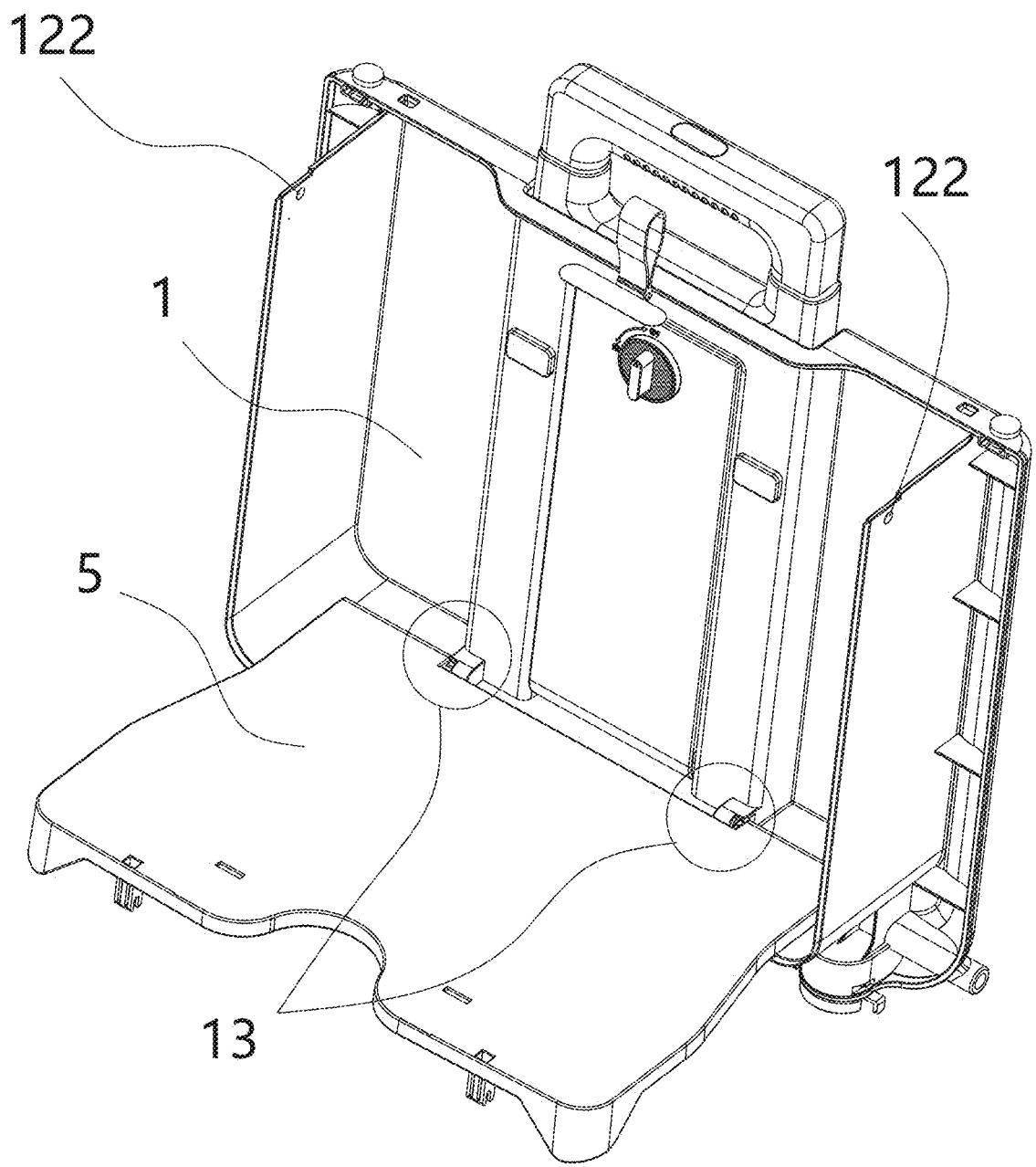
FIG. 7A is a structural diagram showing a connection relationship between the lower box plate and the front box plate.
Figure 7B:
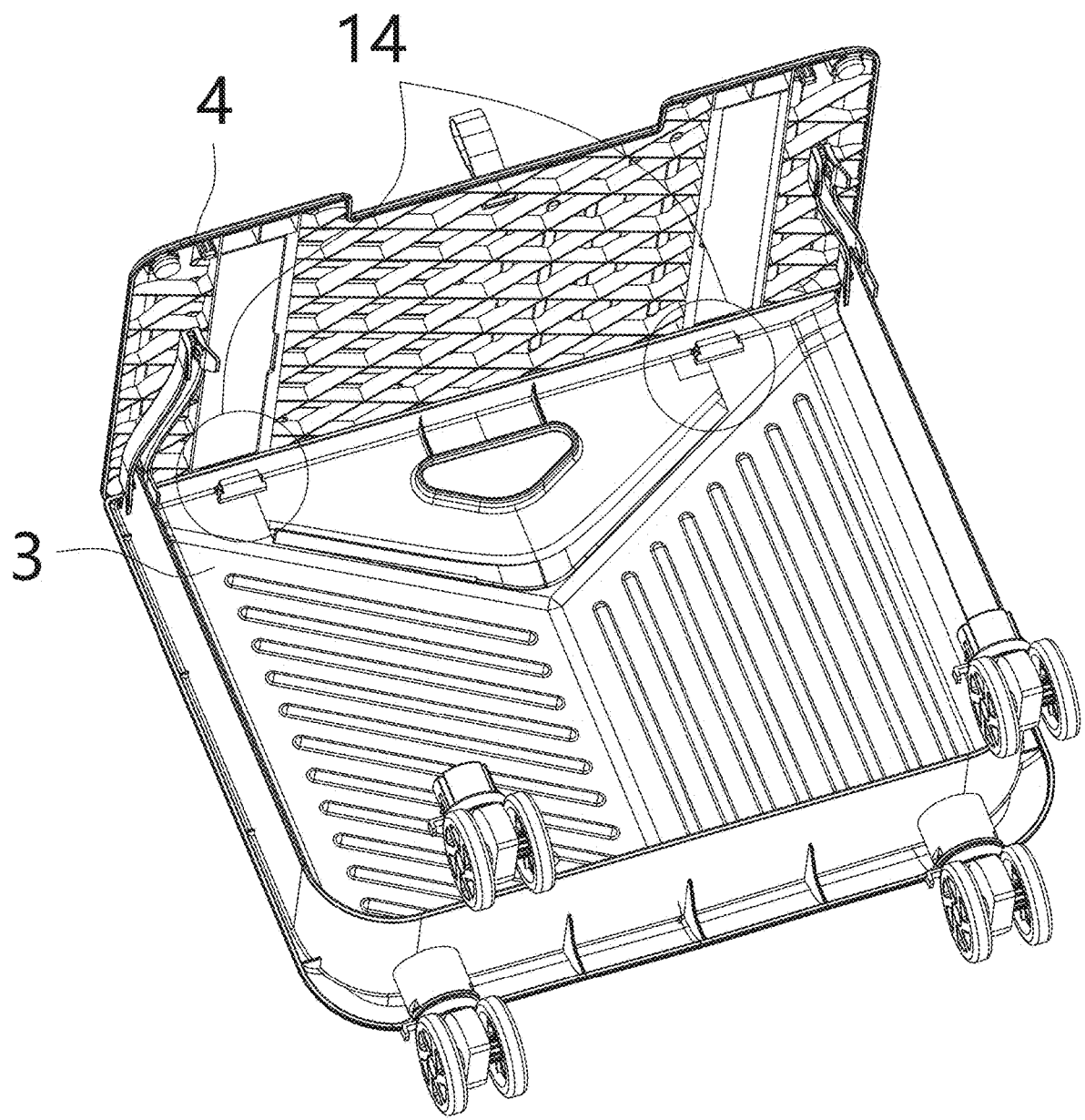
FIG. 7B is a structural diagram showing a connection relationship between the upper box plate and the rear box plate.
Figure 8:
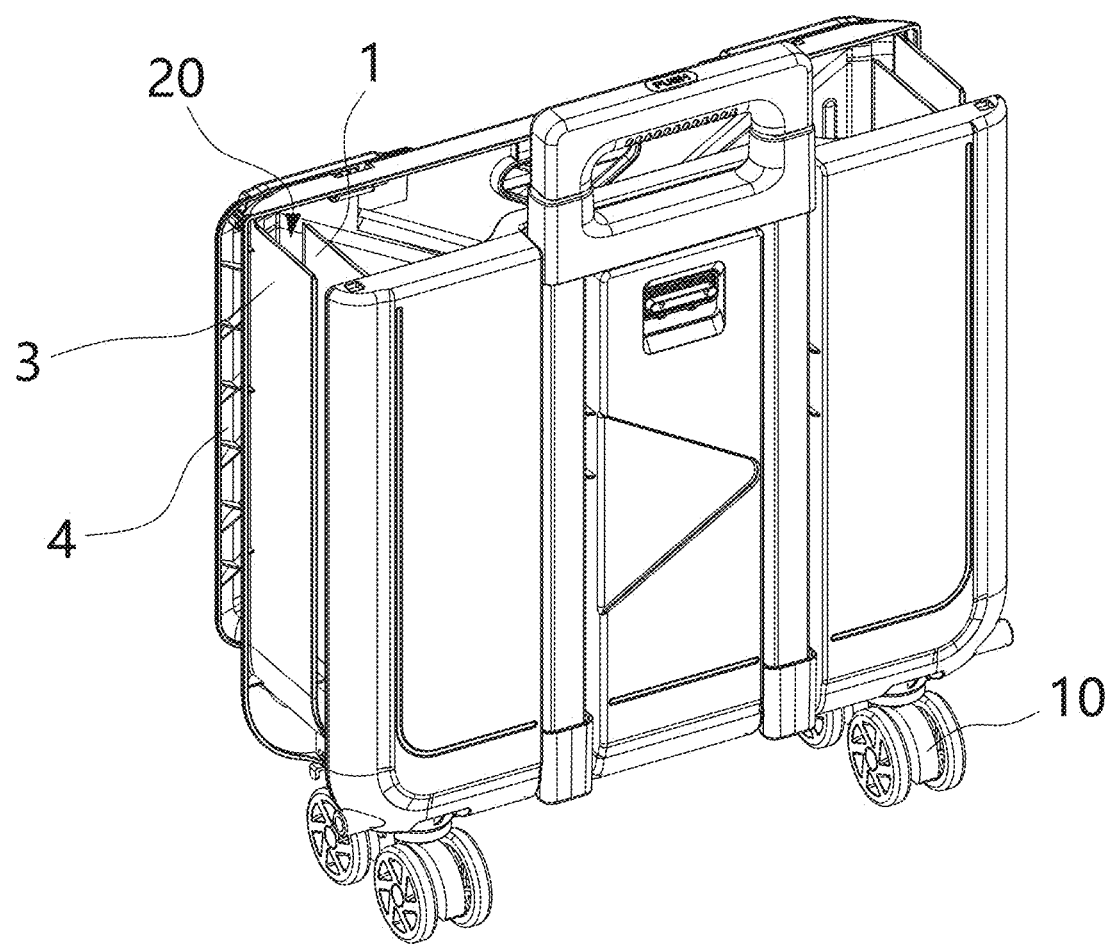
FIG. 8 is a structural diagram of a foldable box body and a shopping cart in a compressed state according to an embodiment of the present application.

FIGS. 7A and 7B show a connection between a lower box plate and a front box plate 13, and a connection between upper box plate and rear box plate 14. It can be seen in conjunction with the drawings that the rotational connection between the upper and lower box plates and the front and rear box plates is such that a fixing clamping notch is provided at an edge of the upper box plate 4, and clamping grooves corresponding to the fixing clamping notch are provided at corresponding edge positions of the front box plate 1 and the rear box plate 3. An upper box plate rotating shaft is provided on the rear box plate 3, an upper box plate rotating clamping groove corresponding to the upper box plate rotating shaft is provided on the upper box plate 4, a lower box plate rotating pore 111 is provided on the front box plate 1, and a lower box plate rotating shaft 51 corresponding to the lower box plate rotating pore 111 is provided on the lower box plate 5. In designing the structure of the connection between the front box plate 13, the connection between the upper box plate and the rear box plate 14, the upper box plate refers to a cover, and a partition plate with a reinforced bottom is on the rotating shaft of the lower box plate.

The fixing clamping notch provided at an edge of the upper box plate 4 is fitted with the corresponding clamping grooves on the front box plate 1 and the rear box plate 3, so that the box body can be quickly positioned and fixed when being connected, thereby improving the assembling efficiency. The fitting of the fixing clamping notch and the clamping grooves also enhances the structural stability of the box body, provides a plurality of contact points for the connection between the rear box plate 3 and the upper box plate 4, disperses the stress, and reduces the risk of damage caused by the force applied to a single connection point. The upper box plate rotating shaft provided on the rear box plate 3 cooperates with the rotating clamping grooves on the upper box plate, achieving the rotating function of the upper box plate, allowing the upper box plate to freely rotate within a certain angle range, facilitating the expanding and folding of the box body. The cooperation of the rotating shaft and the clamping grooves also enables the rotation to be smoother, thereby reducing friction and wear, and prolonging the service life of the box body.

The lower box plate rotating pore 111 on the front box plate 1 cooperates with the lower box plate rotating shaft 51, so that the lower box plate 5 can rotate around the rotation shaft, and folding and unfolding of the box body are achieved. The accurate cooperation between the rotating hole and the rotating shaft ensures stability and reliability of the box body during folding and unfolding, and avoids damage to the box body or a function failure caused by inaccurate cooperation.

By designing the rotational connection manner between the upper and lower box plates and the front and rear box plates, the box body can be quickly folded and unfolded, improving the flexibility and practicability of the box body, so that the box body occupies less space when being transported and stored, being easy to carry and store, and can also be unfolded quickly to meet the usage requirements, improving the durability and reliability of the box body in long-term use. By means of accurate cooperation and smooth rotation, damage caused by friction and wear is reduced, so that the box body can work stably in various environments.

The rotational connection between the upper and lower box plates and the front and rear box plates simplifies the process of assembling and maintaining the box body, and achieves the multi-functional characteristics of folding and unfolding of the box body. The cooperation of the fixing clamping notch and the clamping grooves enables the box body to be assembled more quickly and conveniently. The design of the rotating shaft and the rotating pores makes it easier to maintain and replace the components of the box body, thereby reducing the maintenance costs and time.

As a further embodiment of the present application, in some embodiments, an overturning pull belt 9, also referred to as an overturning pull ring, is provided on the upper box plate 4, and the upper box plate 4 can be driven to rotate around a rotating shaft by pulling the overturning pull belt 9. A storage groove 7 is provided on an inner side of the front box plate 1, and a knob switch 8 is mounted on the storage groove 7. By means of the knob switch 8, the storage groove 7 can be opened, and items are placed in the storage groove 7, thereby further increasing the functions of the foldable box body and the shopping cart.

One important application of the foldable box body disclosed in the embodiments of the present application is to apply the foldable box body to a shopping cart, and the foldable box body in any embodiment disclosed in the embodiments of the present application can be mounted on the shopping cart through rational configuration and improvement. Certainly, a specific application of the embodiment of the present application is not limited to a shopping cart. The foldable box body provided by the embodiment of the present application can be applied to various products according to requirements of different application scenarios, such as a storage box, a storage cabinet and a vehicle-mounted cabinet.

As a further improvement to the shopping cart, a telescopic handle 6 can be mounted on the upper end of the front box body, and the telescopic handle 6 is rotatably connected to the front box plate 1 of the foldable box body, thereby facilitating a user in pulling the shopping cart. Universal wheels 10 are provided at a bottom of the shopping cart, and climbing wheel sets 11 are detachably provided at lower portions on two sides of the shopping cart. The telescopic handle 6 is mounted on the upper end of the front box plate 1. The telescopic handle 6 has a telescopic mechanism, for example, being composed of multiple sections of metal tubes or plastic tubes mutually sleeved, and the telescopic metal or plastic tubes are connected via a spring and a limiting device, so that a smooth telescopic action can be achieved. The telescopic handle 6 enables the handle to be withdrawn to the shortest state when the shopping cart is not in use, thereby greatly reducing the volume of the shopping cart, facilitating storage and carrying; and after retraction, the shopping cart can be folded and placed in a corner or a cabinet, without occupying too much space. The length of the telescopic handle 6 can be adjusted according to different usage scenarios. When a shopping cart needs to be used, the telescopic handle 6 only needs to be pulled gently, and the telescopic handle 6 can be quickly extended to an appropriate length, thereby facilitating a user in pushing and pulling the shopping cart. The universal wheel 10 is generally composed of a wheel with a rotating shaft and a fixed support. The wheel can freely rotate 360 degrees in a horizontal plane, and the rotating shaft allows the wheel to swing at a certain angle in a vertical direction. A shopping cart equipped with the universal wheels 10 can flexibly move in various directions, and can change directions at any time during movement. The climbing wheel set 11 is generally composed of a set of three wheels and a corresponding support structure. The set of three wheels and the support structure can be raised and lowered or folded relative to the main body of the shopping cart. A mounting support for the climbing wheel set 11 is provided at lower portions on two sides of the bottom of the shopping cart. The climbing wheel set can be detachably fixed on the support by means of a bolt or other connectors. When the shopping cart needs to travel on a sloped road surface, the climbing wheel sets 11 can be unfolded to increase the wheel base and the ground contact area of the shopping cart, thereby improving the slope climbing ability and stability of the shopping cart, and preventing the shopping cart from falling due to an excessive slope, so that the shopping cart can better adapt to various road surface conditions, and the detachable design of the climbing wheel sets enables a user to select whether to mount same according to actual needs, avoiding increasing the weight and volume of the shopping cart when no climbing function is required.

Various technical features of the foregoing embodiments may be combined in any way, and for brevity of description, all possible combinations of the technical features in the foregoing embodiments are not described. However, as long as combinations of these technical features are not contradictory, all these technical features should be considered to fall within the scope of the description.

Reference throughout this description to "one embodiment", "an example", "a specific example", and so forth, means that a particular feature, structure, material, or characteristic described in connection with the embodiment or example is included in at least one embodiment or example of the present disclosure. Thus, the appearances of the phrases in various places throughout this description are not necessarily referring to the same embodiment or example of the present disclosure. Furthermore, particular features, structures, materials, or characteristics may be combined in any suitable manner in one or more embodiments or examples.

In the description of the embodiments of the present application, it should be noted that, orientation or position relationships indicated by terms such as "center", "upper", "lower", "left", "right", "vertical", "horizontal", "inner", "outer", "top", and "bottom" are based on the orientation or position relationships shown in the accompanying drawings, which is only for the convenience of describing the embodiments of the present application and simplifying the description, rather than indicating or implying that the indicated device or element must have a specific orientation, be constructed and operated in a specific orientation. Therefore, the embodiments of the present disclosure should not be construed as being limited thereto. In addition, unless specified or limited otherwise, the terms "mounted", "connected", and "coupled" should be used broadly, and may be, for example, fixed connections, detachable connections, or integral connections; may also be mechanical or electrical connections; may also be direct connections or indirect connections via intervening structures; and may also be inner communications of two elements. A person of ordinary skill in the art may understand the specific meanings of the above terms in the embodiments of the present application according to specific situations.

In the embodiments of the present application, unless specified or limited otherwise, the terms "connected" and "fixed" should be understood broadly, for example, "fixed" may be a fixed connection, may also be a detachable connection, or may be integrated; may also be mechanical or electrical connections; may also be direct connections or indirect connections via intervening structures; may also be inner communications of two elements or interaction relationships between two elements, unless expressly defined otherwise. A person of ordinary skill in the art may understand the specific meanings of the above terms in the embodiments of the present application according to specific situations.

Finally, it should be noted that the foregoing embodiments are merely intended for describing the technical solutions of the embodiments of the present application, rather than limiting the present application; although the embodiments of the present application are described in detail with reference to the foregoing embodiments, persons of ordinary skill in the art should understand that they may still make modifications to the technical solutions described in the foregoing embodiments, or make equivalent replacements to some or all technical features thereof; these modifications or replacements do not make the essence of the corresponding technical solutions depart from the scope of the technical solutions of the embodiments of the present application.

The foregoing descriptions are merely some embodiments of the present application, but are not intended to limit the present application. For those skilled in the art, the present application may have various modifications and variations. Any modifications, equivalent replacements, improvements and the like made within the spirit and principle of the present application shall fall within the scope of protection of the present application.

The invention claimed is:

1. A foldable box body, comprising a box plate, wherein the box plate forms an accommodating space; the box plate comprises a front box plate and a rear box plate; a flexible folding portion is provided between the front box plate and the rear box plate; and the front box plate and the rear box plate is foldable by means of the flexible folding portion;
  fixing fasteners are provided between the front box plate and the rear box plate, one end of each of the fixing fasteners is movably connected to the front box plate, and another end of each of the fixing fasteners is movably connected to the rear box plate;
  the fixing fasteners are bar-shaped, fixing columns are provided at two ends of each of the fixing fasteners, and fixing pores corresponding to the fixing columns are provided at corresponding positions of the front box plate and the rear box plate.

2. The foldable box body according to claim 1, wherein the flexible folding portion is integrally formed or movably connected with the front box plate and the rear box plate.

3. The foldable box body according to claim 1, wherein the flexible folding portion is U-shaped, one side of the flexible folding portion is fixedly connected to the front box plate, and another side of the flexible folding portion is fixedly connected to the rear box plate.

4. The foldable box body according to claim 1, further comprising an upper box plate rotatably connected to the rear box plate.

5. The foldable box body according to claim 1, wherein a storage groove is provided on an inner side of the front box plate, and a knob switch is mounted on the storage groove.

6. The foldable box body according to claim 1, further comprising a lower box plate rotatably connected to the front box plate.

7. A foldable box body, comprising a box plate, wherein the box plate forms an accommodating space; the box plate comprises a front box plate and a rear box plate; a flexible folding portion is provided between the front box plate and the rear box plate; and the front box plate and the rear box plate is foldable by means of the flexible folding portion;
  wherein the foldable box body further comprises an upper box plate rotatably connected to the rear box plate;
  wherein an upper box plate rotating shaft is provided on the rear box plate, an upper box plate rotating clamping groove corresponding to the upper box plate rotating shaft is provided on the upper box plate, a lower box plate rotating pore is provided on the front box plate, and a lower box plate rotating shaft corresponding to the lower box plate rotating pore is provided on a lower box plate.

8. The foldable box body according to claim 7, wherein an overturning pull ring or an overturning pull belt is provided on the upper box plate.

9. A shopping cart, comprising a foldable box body, wherein the foldable box body comprises a box plate, the box plate forms an accommodating space, the box plate comprises a front box plate and a rear box plate, a flexible folding portion is provided between the front box plate and the rear box plate, and the front box plate and the rear box plate are foldable by means of the flexible folding portion;
  fixing fasteners are provided between the front box plate and the rear box plate, one end of each of the fixing fasteners is movably connected to the front box plate, and another end of each of the fixing fasteners is movably connected to the rear box plate;
  the fixing fasteners are bar-shaped, fixing columns are provided at two ends of each of the fixing fasteners, and fixing pores corresponding to the fixing columns are provided at corresponding positions of the front box plate and the rear box plate.

10. The shopping cart according to claim 9, wherein a telescopic pull handle is mounted at an upper end of the front box plate.

11. The shopping cart according to claim 10, wherein the telescopic pull handle is rotatably connected to the front box plate.

12. The shopping cart according to claim 11, wherein climbing wheel sets are detachably provided at lower portions on two sides of the shopping cart.

13. The shopping cart according to claim 9, wherein universal wheels are provided at a bottom of the shopping cart.

* * * * *